United States Patent [19]
Sandhagen

[11] Patent Number: 5,908,178
[45] Date of Patent: Jun. 1, 1999

[54] AIRCRAFT SECURITY APPARATUS AND METHOD

[76] Inventor: Robert A. Sandhagen, 2240 Danube Way, Upland, Calif. 91784

[21] Appl. No.: 08/975,849

[22] Filed: Nov. 20, 1997

[51] Int. Cl.$^6$ .............................. B64C 13/14; E05B 65/00
[52] U.S. Cl. .............................. 244/224; 244/1 R; 70/57; 70/58
[58] Field of Search .................................... 244/1 R, 121, 244/224; 70/163, 167, 158, 168, 198, 200, 199

[56] References Cited

U.S. PATENT DOCUMENTS

| | | |
|---|---|---|
| 1,333,093 | 3/1920 | Pierce . |
| 3,462,982 | 8/1969 | Moore . |
| 3,699,787 | 10/1972 | Corrado ................................... 70/167 |
| 4,228,974 | 10/1980 | Yates ....................................... 244/224 |
| 4,299,361 | 11/1981 | Webb . |
| 4,335,798 | 6/1982 | Adickes . |
| 4,475,366 | 10/1984 | Marneris . |
| 4,888,968 | 12/1989 | Azvedo . |
| 4,935,047 | 6/1990 | Wu . |
| 5,042,754 | 8/1991 | Heath ....................................... 244/224 |
| 5,082,213 | 1/1992 | Torres . |
| 5,251,465 | 10/1993 | Hwang . |
| 5,277,042 | 1/1994 | Tobias . |
| 5,394,713 | 3/1995 | Harmon . |
| 5,546,775 | 8/1996 | Lee . |
| 5,582,363 | 12/1996 | Davis . |
| 5,600,979 | 2/1997 | Winner et al. . |
| 5,613,383 | 3/1997 | Banez . |
| 5,635,899 | 6/1997 | Carlo et al. . |

OTHER PUBLICATIONS

Advertisement ( Web page ) , Express Systems & Engineering, Inc., "Welcome to InstrLoc", 1997.

*Primary Examiner*—Charles T. Jordan
*Assistant Examiner*—Patricia L. Zuniga
*Attorney, Agent, or Firm*—David Weiss

[57] ABSTRACT

Security apparatus and a method for preventing theft or unauthorized removal of instruments from the cockpit instrument panel of an aircraft and for preventing theft or unauthorized use of the aircraft. The apparatus includes a rigid plate substantially covering the instrument panel and two rigid arms pivotally secured to the plate inwardly of the columns respectively and laterally pivotable rearwardly away from and forwardly toward the plate. Each of the arms include an end portion for restrainably engaging the aircraft flight control yokes against rotation when the arms are pivoted to extend rearwardly away from the plate while the columns are fully rearwardly extended and the yokes are fully rotated to one side. A locking device is engageable with the end portions of the arms for locking the arms rearwardly extended and for cooperating with the yokes to prevent forward displacement of the columns while securing the plate against the instrument panel.

13 Claims, 3 Drawing Sheets

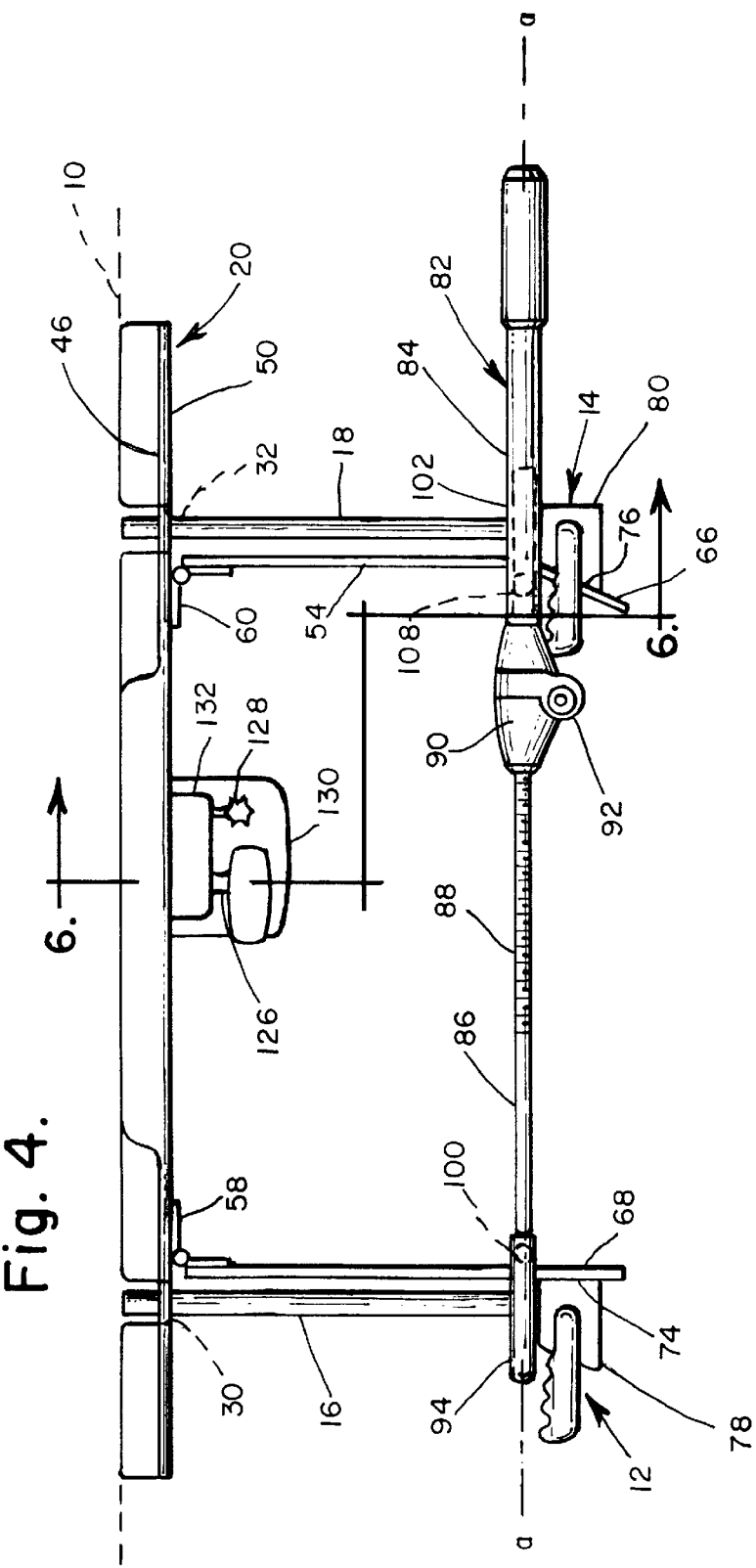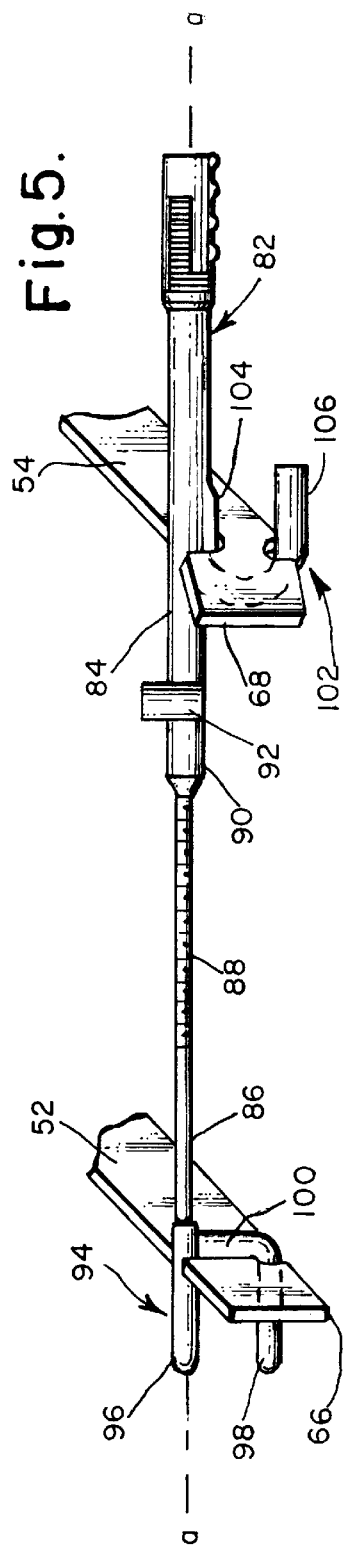

5,908,178

AIRCRAFT SECURITY APPARATUS AND METHOD

BACKGROUND OF THE INVENTION

This invention relates to security systems for aircraft, and more particularly to a method and apparatus for preventing theft or unauthorized removal of instruments from the cockpit instrument panel of an aircraft and for preventing theft or unauthorized use of the aircraft.

The cockpit of privately owned or light aircraft is commonly equipped with an instrument panel accommodating various instruments, avionics, radios and other equipment, all of which may be referred to as simply "instruments". Positioned beneath the aircraft windshield and rearwardly facing, the instrument panel permits the instruments to be conveniently viewable by the pilot and copilot operating the aircraft. In some aircraft, the instrument panel is fitted with a glare shield along the panel's upper edge.

Rearwardly extending from the instrument panel are two flight control columns terminating with respective flight control yokes or wheels that are manipulated by the pilot or copilot for controlling the aircraft's ailerons and elevators. The flight control columns are slaved to one another, so that movement of either yoke will result in corresponding movement of the other yoke and both columns. Turning or rotating a yoke causes corresponding rotation of the columns for adjusting position of the ailerons, for controlling rotation of the aircraft about its longitudinal or roll axis. Rearward pulling and forward pushing of the yoke, resulting in corresponding rearward and forward longitudinal movement of the control columns, adjusts position of the aircraft's elevators for controlling the aircraft's pitch motion about its lateral or pitch axis.

Since private aircraft are often tied down at airfields lacking in effective security, they are accessible to unauthorized entry and, consequently, to unauthorized removal or theft of instruments from the instrument panel as well as unauthorized use or theft of the aircraft itself. Various systems have been devised for addressing this problem, including apparatus for locking a cover plate immediately rearwardly of the instrument panel and for locking the flight control columns against rotation and longitudinal movement. The apparatus of the prior art appear to require risk to the integrity of the columns, however, such as by providing a physical circumferencial clamping of the columns or the drilling of an aperture along a diameter of at least one of the columns for inserting a gust lock pin therethrough.

SUMMARY OF THE INVENTION

The present invention provides security apparatus for preventing theft or unauthorized removal of instruments from the aircraft's instrument panel, as well as for preventing theft or unauthorized use of the aircraft, without physical clamping of the flight control columns and without requiring an aperture in one of the columns for insertion of a gust lock pin.

Briefly described, the apparatus of the present invention comprises, for combination with an aircraft having an instrument panel and two flight control yokes with respective flight control columns rearwardly extending from the instrument panel: a rigid plate for substantially covering the instrument panel; two rigid arms pivotally secured to the plate inwardly of the columns respectively when the plate substantially covers the instrument panel, for being laterally pivoted rearwardly away from and forwardly toward the plate, each of the arms including an end portion for restrainably engaging the yokes against rotation when the arms are pivoted to extend rearwardly away from the plate while the columns are fully rearwardly extended and the yokes are fully rotated to one side; and a locking device engageable with the end portions of the arms for locking the arms rearwardly extended and for preventing forward displacement of the yokes with the plate substantially covering the instrument panel.

The locking device includes an axially extensible apparatus connecting two outwardly opening hooks and a lock for locking the extensible apparatus for preventing axial contraction thereof; and the end portions of the arms are adapted for respectively receiving the hooks when the arms are rearwardly extended with the extensible apparatus axially extended laterally between the arms. The locking device when locked prevents axial contraction of the extensible apparatus. The two hooks each include legs outwardly extending in the axial direction of the extensible apparatus, and the end portions of the arms include openings for receiving such legs of the hooks respectively with the extensible apparatus axially extended laterally between the rearwardly extended arms. The openings are situated in the end portions of the arms for causing the received legs to interfere with and prevent forward displacement of the yokes when the plate substantially covers the instrument panel and the arms are rearwardly extended.

The plate includes two inverted generally U-shaped slots laterally spaced apart and open along the plate's bottom edge, for receiving the control columns when the plate is positioned for substantially covering the instrument panel, and the arms are hingedly secured to the plate immediately inwardly of the slots respectively. The plate preferably includes rearwardly extending lips along the plate's top and bottom edges, the lips being adapted for engaging the instrument panel when the plate substantially covers the panel for preventing contact by the plate with the instruments on the panel. For aircraft that include a glare shield along the top of the instrument panel, the top edge of the plate may be contoured to engage the glare shield when the plate substantially covers the instrument panel.

As a further security measure, the plate may include a stop or tab for preventing operation of the engine controls typically located in the vicinity of the instrument panel. In the preferred embodiment, the plate includes a rearwardly extending tab situated for interfering with and preventing operational movement of at least one of the engine controls, such as the aircraft's throttle control lever and/or the aircraft's fuel mixture control, when the security apparatus of the present invention is secured in place with the plate substantially covering the instrument panel.

In accordance with another aspect thereof and in combination with an aircraft, the present apparatus comprises: a rearwardly facing instrument panel installed in the aircraft; two flight control columns fully rearwardly extended from the instrument panel and terminating with respective flight control yokes fully rotated to one side; a rigid plate substantially covering the instrument panel; two rigid arms secured to the plate inwardly of the columns respectively, each of the arms extending rearwardly of the plate and including an end portion restrainably engaging the yokes respectively against rotation; and a locking device engageable with the end portions of the arms rearwardly extended for cooperating with the yokes for preventing forward displacement of the columns. The rigid arms are preferably pivotally secured to the plate for being laterally pivoted forwardly toward the plate and rearwardly away from the plate, the end portions of the arms disengaging the yokes when the arms are forwardly pivoted; and the locking device is engageable with the end portions for locking the arms rearwardly extended and is disengageable from the end portions for unlocking the arms for permitting the arms to be forwardly pivoted.

The present invention, according to a further aspect thereof, includes a method for preventing unauthorized removal of instruments from the instrument panel of an aircraft and for preventing unauthorized use of the aircraft, the aircraft including two flight control yokes with respective flight control columns rearwardly extending from the instrument panel, the method comprising the steps of: rotating the yokes fully to one side and pulling the columns fully rearwardly extended; providing a rigid plate adapted for substantially covering the instrument panel, the plate having two rigid arms laterally pivotally secured thereto inwardly of the columns when the plate substantially covers the instrument panel; placing the plate against the instrument panel for substantially covering the instrument panel; laterally pivoting the arms such that the arms are rearwardly extended and engage the yokes for restraining rotational movement of the yokes; providing means on the rearwardly extended arms for preventing forward displacement of the yokes; and locking the arms rearwardly extended.

BRIEF DESCRIPTION OF THE DRAWING

The novel features which are believed to be characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

FIG. 4 is a top plan view of the preferred embodiment of the present invention, as completely assembled, shown in combination with the cockpit instrument panel and the aircraft's pilot and copilot flight control yokes and flight control columns;

FIG. 5 is a fragmentary perspective view of the rearwardly extended arms and locking device of the preferred embodiment of the present invention;

DESCRIPTION OF THE PREFERRED EMBODIMENT

Figure 1:
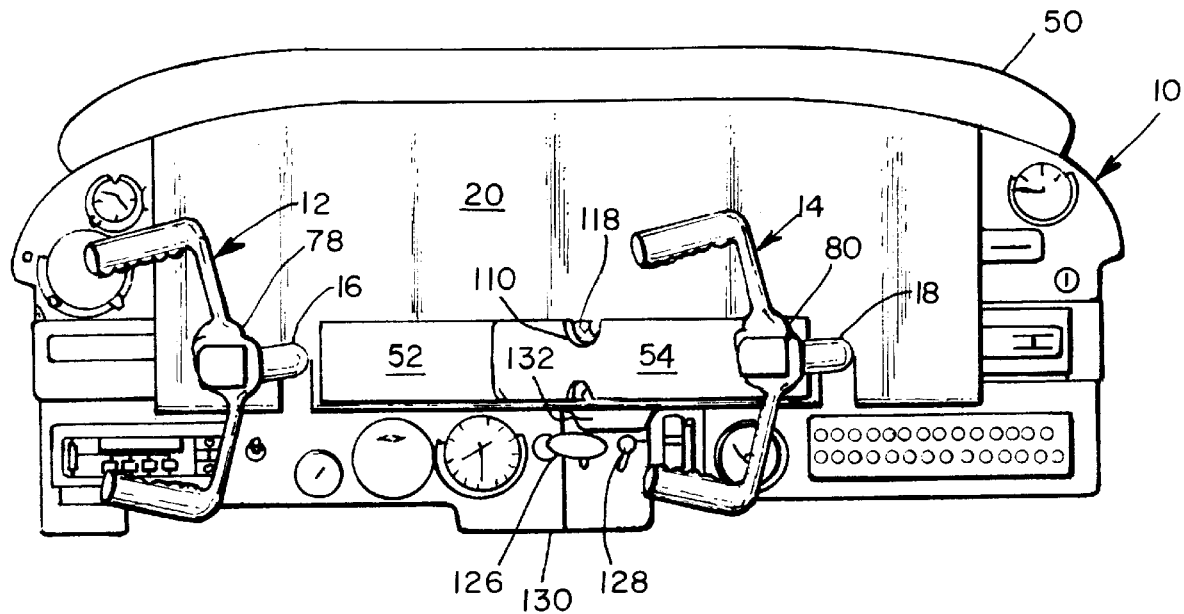
FIG. 1 is a perspective view of a security plate with pivotable arms, in accordance with a preferred embodiment of the present invention, in combination with an instrument panel of a cockpit of a light aircraft.

Turning first to FIG. 1, there is shown an example of an instrument panel 10 in a cockpit of an aircraft, and by specific example of a Piper single engine aircraft. The aircraft includes two flight control wheels or yokes 12, 14 at the rearward ends respectively of two flight control columns 16, 18 rearwardly extending from the instrument panel 10. The left yoke 12 is conventionally manipulated by the aircraft's pilot, and the right yoke 14 by the copilot, with the columns 16, 18 slaved to one another so that movement of either yoke 12, 14 will cause corresponding rotation of the columns 16, 18, and rearward pulling or forward pushing of either of the yokes 12, 14 will result in corresponding rearward and forward axial movement of the control columns. As noted earlier, the aircraft's elevators and hence the pitch of the aircraft during flight are controlled by rearward and forward longitudinal movement or displacement of the control columns 16, 18 (controlled by rearward pulling and forward pushing of one of the yokes 12, 14), while adjusting position of the ailerons for controlling aircraft roll during flight is controlled by rotation of the columns 16, 18 (i.e., by rotation or deflection of the yokes 12, 14).

As used herein, the word "forward" corresponds to the fore or forward direction of the aircraft (i.e. looking toward the front or nose of the aircraft), and the word "rearward" corresponds to the aft or rearward direction of the aircraft (i.e., looking toward the rear or tail of the aircraft). Accordingly, the instrument panel 10 is rearwardly facing, and the flight control columns 16, 18 rearwardly extend or project from the instrument panel 10. As represented in FIG. 1, the yokes 12, 14 have been pulled fully rearward so that the control columns 16, 18 are fully rearwardly extended; and the yokes 12, 14 have been deflected or rotated fully to the left side, i.e. to the pilot's and copilot's left side when looking forwardly at the rearwardly facing instrument panel 10.

Figure 2:
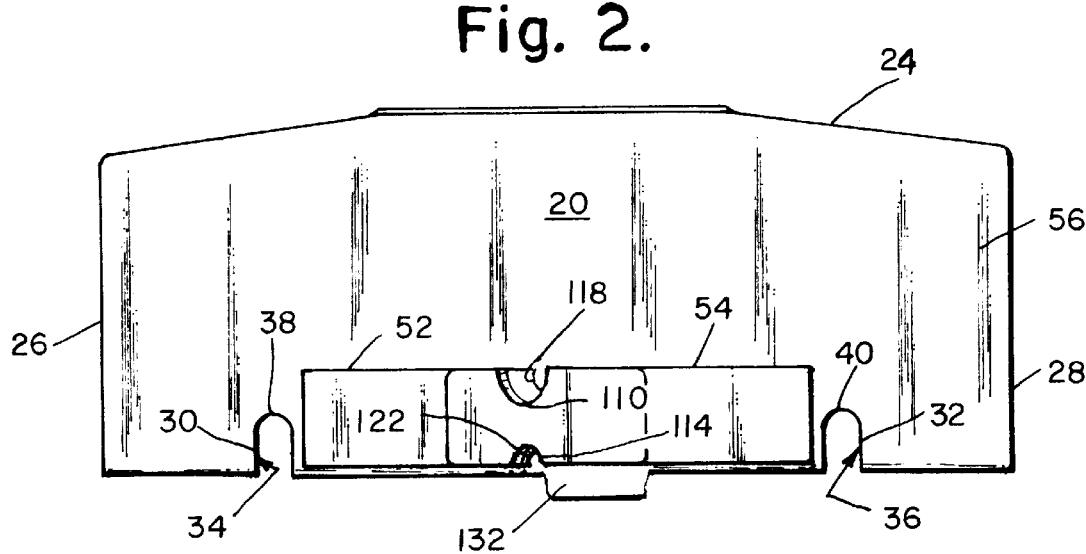
FIG. 2 is an elevation view of the plate and pivotable arms shown in FIG. 1.
Figure 6:
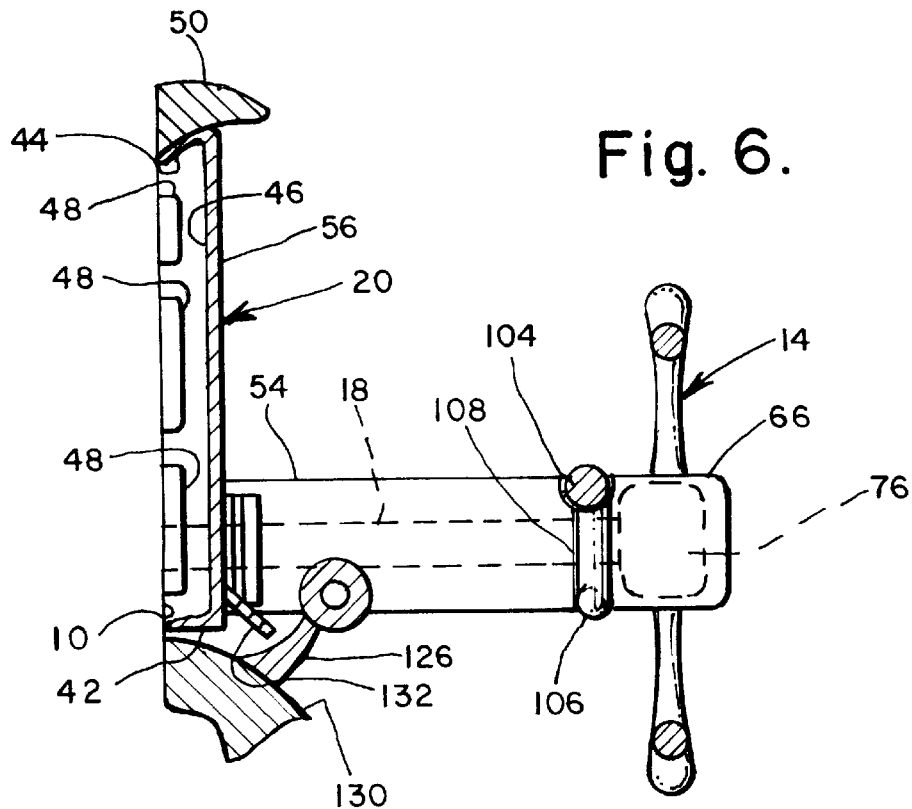
FIG. 6 is a side sectional view of the apparatus of FIG. 4 viewed along the line 6—6 in the direction of the appended arrows.

The preferred embodiment of the security device of the present invention will be described with reference to FIGS. 1–7. The device includes a rigid plate 20 having a bottom edge 22, a top edge 24, a left side 26 and a right side 28. The plate 20 is fabricated preferably of a metal sheet such as aluminum or steel of at least approximately ⅛ inch thickness. Two generally inverted U-shaped slots 30, 32 extend into the plate 20 from the slots' openings 34, 36 along the plate's bottom edge 22 and terminating with generally semicircular ends 38, 40. The slots 30, 32 are spaced along the plate's width or lateral dimension (i.e., in the horizontal dimension as shown in FIG. 2) and are of width for permitting the plate 20 to be positioned rearwardly of the instrument panel 10 with the flight control columns 16, 18 being received by the slots 30, 32, respectively, and with the slots' closed ends 38, 40 resting upon the columns 16, 18. The width or lateral dimension of the plate 20 and the height or vertical dimension (i.e., the vertical dimension in the plane of the drawing of FIG. 2) are such that the plate 20 when so positioned substantially covers the instrument panel 10 as shown in FIG. 1. Flanges or lips 42 extend rearwardly along the plate's bottom edge 22, and a flange or lip 44 extends rearwardly along the plate's top edge 24. These lips 42, 44 are of sufficient depth (say, for example, one inch) for preventing the forwardly facing surface 46 of the plate 20 from contacting instruments 48 (including switches and knobs) on the instrument panel 10 (see FIG. 6) when the lips 42, 44 contact the instrument panel 10 with the plate 20 in place for substantially covering the instrument panel 10. For aircraft that include a glare shield 50 (see FIGS. 1 and 6) above the instrument panel 10, the rearwardly extending lip 44 farther extends slightly downwardly (as shown in FIG. 6), and the top edge 24 of the plate 20 may be contoured to engage the underside of the glare shield 50 when the plate 20 is in place substantially covering the instrument panel 10.

For installation of the plate 20 in a Piper aircraft as shown in FIG. 1, the width dimension in one example of the plate 20 was approximately 30¾ inch, the height dimension was approximately 11 inches along the sides 26, 28 extending to approximately 12¼ inches at the center of the contoured top edge 24, the width of each of the slots 30, 32 was approximately 1¼ inches and their height (from the plate's bottom edge 22 to their closed semicircular ends 38, 40 was approximately 2⅛ inches, and the lateral distance between the vertical center-lines of the slots 30, 32 was approximately 19⅜ inches.

Figure 3:
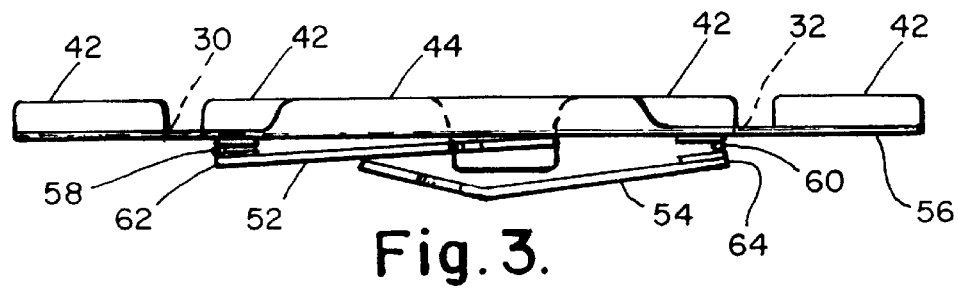
FIG. 3 is a top plan view of the apparatus of FIG. 2.

Two rigid arms 52, 54 are pivotally secured to the rearwardly facing surface 56 of the plate 20, immediately inwardly of the slots 30, 32. Hinges 58, 60 are secured to the plate's rear surface 56 immediately laterally inwardly of the slots 30, 32, respectively, the hinges 58, 60 also secured to the arms 52, 54 at respective first ends 62, 64 thereof, for pivoting the arms 52, 54 about vertical hinge axes (i.e., about hinge axes perpendicular to the plane of the drawing of FIGS. 3 and 4) immediately inwardly of the slots 30, 32 laterally toward the plate 20 (as shown in FIGS. 2 and 3) and laterally rearwardly away from the plate 20 to extend generally perpendicular therefrom (as shown in FIG. 4). When the plate 20 is positioned to substantially cover the instrument panel 10 with the flight control columns 16, 18 received by the slots 30, 32 (as in FIG. 1), the arms 52, 54 may be laterally pivoted rearwardly away from the plate 20 to extend generally perpendicular to the plate 20 and inwardly adjacent to the flight control columns 16, 18 as shown in FIG. 4.

The arms 52, 54 are of length greater than the length of the flight control columns 16, 18 when fully rearwardly extended, and the arms 52, 54 include respective end portions 66, 68 in the vicinity of the arms' free second ends 70, 72 for restrainably engaging the yokes 12, 14 against rotation. This is accomplished by the end portion 66 of the left arm 52 contacting a mating surface 74 of the left yoke 12, and the end portion 68 of the right arm 54 contacting a mating surface 76 of the right yoke 14. In a Piper aircraft, when the yokes 12, 14 are fully rotated to the left (as shown in FIGS. 1 and 4) the hub 78 of the left yoke 12 includes a substantially planar surface 74 orthogonal to the installed plate 20 and the planar surface of the left arm's end portion 68 conforms to or mates with the inwardly facing yoke surface 74 when the left arm 52 is rearwardly extended from the installed plate 20. The inner surface 76 of the hub 80 of the right yoke 14 (i.e., when the yoke 14 is fully rotated to the left) is in a vertical plane acutely angularly disposed from the rearwardly extending arms, and accordingly the end portion 68 of the right arm 54 is similarly angularly disposed such that the end portion 68 conforms to or mates with the inwardly facing surface 76 of the hub 80 when the right arm 54 is rearwardly extended from the installed panel 20.

The rearwardly extended arms 52, 54 are locked in such rearwardly extended positions by means of a locking device 82 cooperating with the rearwardly extended arms 52, 54, such that the arms' end portions 66, 68 respectively contact the yokes' surfaces 74, 76 as described above for preventing the yokes 12, 14 from being turned to the right. The locking device's 82 cooperation with the end portions 66, 68 of the arms 52, 54 and with the yokes 12, 14 further prevent axial forward displacement of the fully rearwardly extended flight control columns 16, 18 while securing the plate 20 against the instrument panel 10, as explained below.

The locking device 82 includes an axially extensible apparatus connecting two hooks and a lock for locking the extensible apparatus for preventing axial contraction thereof. A preferred embodiment of such locking device 82 is an automobile steering wheel lock marketed by Winner International Corporation (of Sharon, Pa.) under the registered trademark "CLUB". Such a locking device is disclosed in U.S. Pat. No. 4,935,047, issued Jun. 19, 1990, to Jinn F. Wu, and U.S. Pat. No. 5,277,042, issued Jan. 11, 1994, to Marc W. Tobias, both of which patents and their disclosures are hereby incorporated herein by this reference. Briefly, the locking device 82 (see FIGS. 4 and 5) includes an extensible apparatus comprising an elongated sleeve member 84 having an axis a—a and an elongated shaft member 86 telescopically receivable in the sleeve member 84. As more fully described in the Wu and Tobias patents, ratchet teeth 88 along the shaft 86 cooperate with a ratchet pawl in a lock housing 90 on the sleeve 84, for permitting the shaft 86 to axially extend from the sleeve 84 and to be locked for preventing axial contraction of the shaft 86 into the sleeve 84. The shaft 86 may be unlocked from the sleeve by operatively inserting a key in a key lock cylinder 92 for permitting axial contraction of the shaft 86 into the sleeve 84.

The locking device 82 includes a first hook 94 comprising two legs 96, 98 (the leg 96 may be an extension of the shaft 86) outwardly extending in the axial direction (i.e., parallel to the axis a—a) and a connecting member 100 for defining the generally U-shaped hook 94. A second hook 102 on the shaft 84 includes two legs 104, 106 (the leg 104 may include a portion of the sleeve member 84) outwardly extending in the axial direction (i.e., parallel to the axis a—a) and a connecting member 108 for defining the generally U-shaped second hook 102. The legs of the respective hooks being outwardly extending in the axial direction, the hooks 94, 102 face oppositely one another with the connecting members 100, 108 inwardly of the hooks' openings, as shown in FIG. 5.

Figure 7A:
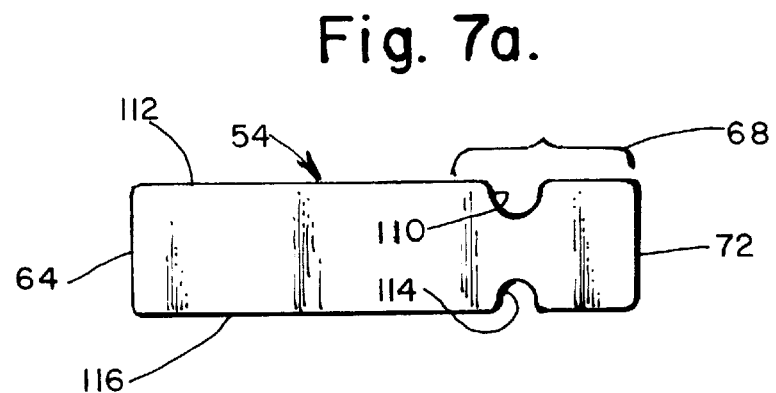
FIG. 7a is a side elevation view of the right arm of the preferred embodiment of the present invention, for example as shown in FIG. 4.
Figure 7B:
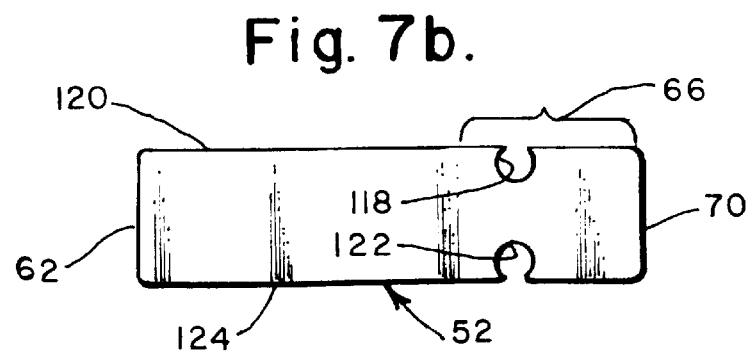
FIG. 7b is a side elevation view of the left arm of the preferred embodiment of the present invention, for example as shown in FIG. 4.

As best shown in FIG. 7a, the end portion 68 of the right arm 54 includes an upper opening or rounded notch 110 extending from the right arm's upper edge 112 and a lower opening or rounded notch 114 extending from the right arm's lower edge 116. The notches 110, 114 are vertically aligned with one another, and their dimensions and their vertical separation are such that the lower notch 114 may receive the sleeve hook's lower leg 106 of the locking device 82 and the upper notch 110 may simultaneously receive the sleeve hook's upper leg 104, as shown in FIG. 5. Similarly, as best shown in FIG. 7b, the left arm 52 includes an upper opening or rounded notch 118 (which may have an arc greater than 180°, as shown in FIG. 7b) extending from the left arm's upper edge 120 and a lower opening or rounded notch 122 (which also may have an arc greater than 180°) extending from the left arm's lower edge 124. The notches 118, 122 are vertically aligned and their dimensions and vertical separation are configured such that the lower notch 122 may receive the shaft hook's lower leg 98 and the arm's upper notch 118 may simultaneously receive the shaft hook's upper leg 96, as shown in FIG. 5. The positions of the notches 110, 114 along the longitudinal dimension of the right arm 54 and the positions of the notches 118, 122 along the longitudinal dimension of the left arm 52, are such that the hook 94 (and specifically the legs 96, 98) is positioned immediately forwardly of the left yoke's hub 78 and the sleeve hook 102 (and specifically the legs 104, 106) are positioned immediately forwardly of the right yoke's hub 80, interfering with and preventing forward displacement of the yokes 12, 14 (and hence of the columns 16, 18) when the plate 20 is installed and the arms 52, 54 are fully rearwardly extending as shown, while coercingly securing the plate 20 against the instrument panel 10. When the locking device 82 is axially extended and locked against axial contraction, the hooks' connecting members 100, 106 outwardly engage the arms' end portions 66, 68 and lock the arms 52, 54 in their fully rearwardly extended position.

In one example for use with a Piper aircraft, the longitudinal dimension of the arms 52, 54 was approximately 12 inches, the vertical center-lines of the notches 118, 122 and of the notches 110, 114 were approximately 7/8 inches from their respective hinged edges 62, 64 along the arms' longitudinal dimension, the height dimension of the arms 52, 54 was approximately 3 inches, the vertical separation between the notches 110, 114 of the right arm 54 was approximately 1⅜ inches, and the vertical separation between the notches 118, 122 of the left arm 52 was approximately 1½ inches. The notches 118, 122 were approximately ¾ inch in diameter, the notch 110 was approximately 1⅛ inch along the longitudinal dimension, and the notch 114 was approximately ⅞ inch along the longitudinal dimension.

An aircraft's engine controls consist of a throttle control for adjusting engine RPM and a mixture control for adjusting air to fuel ratio. As shown in FIGS. 1 and 4, the aircraft's throttle control lever 126 and mixture control lever 128 are generally located on a control quadrant 130 at the lower center of the instrument panel 10 for accessibility to both the pilot and the copilot. The preferred embodiment of the security apparatus of the present invention includes a stop or tab 132 rearwardly extending from the installed plate 20 and positioned along or just above the bottom edge 22 of the plate 20 for interfering with operational movement of the throttle lever 126 and the mixture control lever 128. As shown in FIG. 6, the rearwardly extending tab 132 is also downwardly inclined from the plate 20. The lateral dimension of the tab 132 is approximately 3¼ inches, and extends approximately 1¼ inches rearwardly of the plate 20.

Summarizing the installation or manner of operation of the security device of the present invention, including its method of use, the flight control yokes 12, 14 of the aircraft are rotated fully to the left side and rearwardly pulled such that the flight control columns are fully rearwardly extended. The plate 20 (specifically the lips 42, 44) is placed against the instrument panel 10 with the U-shaped slots 30, 32 receiving the columns 16, 18, respectively; for aircraft including a glare shield 46, the lip 44 may also be placed for contacting the shield's bottom surface. The rigid arms 52, 54 are then laterally pivoted rearwardly away from the plate 20 such that the arms 52, 54 are rearwardly extended approximately perpendicular to the plate 20 and inwardly of the columns 16, 18 until the inner surfaces 74, 76 of the rotated yokes 12, 14 are contacted by the end portions 66, 68 of the arms 52, 54 which generally conform to or mate with the yoke surfaces 74, 76. The locking device 82, which has been axially contracted, is placed between the arms 52, 54 and axially extended with the hook 94 received by the notches 118, 122 of the left arm's end portion 66 immediately forwardly of the yoke 16, and with the hook 102 being received by the right arm's notches 110, 114 immediately forwardly of the yoke 18. The axially extended locking device 82 is then locked in place with the hooks' connecting members 100, 108 preventing the arms 52, 54 from pivoting inwardly. The locked end portions 66, 68 of the rearwardly extending arms 52, 54 immobilize the yokes 12, 14 and hence the columns 16, 18 against rotation, while the legs of the hooks 94, 102 are lockedly retained by the arms' end portions 66, 68 for locking the yokes 12, 14 (and hence the columns 16, 18) in their most rearward position while the rearwardly extended rigid arms 52, 54 secure the plate 20 against the instrument panel 10 for preventing theft of the instruments. The complete immobilization of the flight control columns 16, 18 prevents operation of the aircraft's elevators and ailerons, causing the aircraft to be unflyable. In addition, the rearwardly extending tab 130 functions as a lever stop for preventing operation of the aircraft's throttle and mixture functions, further assuring against theft of the aircraft.

To remove the security apparatus, the locking device 82 is unlocked with a key and is axially contracted by telescoping the shaft 86 into the sleeve 84. The locking device 82 is removed and the arms 52, 54 are laterally pivoted inwardly toward the plate 20. The securement of the plate 20 against the instrument panel 10 is accordingly released and the plate 20 may be removed from the instrument panel 10.

It may be appreciated that, although the foregoing description refers to the yokes 12, 14 as being rotated fully to the left, the security device of the present invention is applicable under conditions where the yokes 12, 14 may be fully rotated to the right side. In such case, however, the ends 66, 68 of the arms 52, 54 would be modified to mate with the different inner surfaces of the yokes' hubs 78, 80.

Thus, there has been disclosed a security apparatus and method for substantially covering an aircraft's instrument panel and for immobilizing the aircraft's flight controls, thereby preventing theft or unauthorized removal of instruments from the instrument panel and for preventing theft or unauthorized use of the aircraft. Other embodiments and configurations of the security apparatus and method of the present invention, may be developed without departing from the essential characteristics thereof. Accordingly, the invention should be limited only by the scope of the claims listed below.

I claim:

1. For combination with an aircraft having an instrument panel and two flight control yokes with respective control columns rearwardly extending from the instrument panel, security apparatus for preventing unauthorized removal of instruments from the instrument panel and for preventing unauthorized use of the aircraft, the security apparatus comprising:

a rigid plate for substantially covering the instrument panel;

two rigid arms pivotally secured to said plate inwardly of said columns respectively when said plate substantially covers the instrument panel, for being laterally pivoted rearwardly away from and forwardly toward said plate, each of said arms including an end portion for restrainably engaging the yokes against rotation when said arms are pivoted to extend rearwardly away from said plate while the columns are fully rearwardly extended and the yokes are fully rotated to one side; and a locking device engagable with the end portions of said arms for locking said arms rearwardly extended and for preventing forward displacement of the yokes with said plate substantially covering the instrument panel.

2. The security apparatus according to claim 1, wherein:

said locking device includes an axially extensible apparatus connecting two hooks and a lock for locking said extensible apparatus for preventing axial contraction thereof; and said end portions of said arms adapted for respectively receiving said hooks when said arms are rearwardly extended with said extensible apparatus axially extended laterally between said arms.

3. The security apparatus according to claim 1, wherein:

said locking device includes an axially extensible apparatus having a lock for preventing axial contraction thereof, said extensible apparatus connecting two hooks with legs outwardly extending in the axial direction of said extensible apparatus; and said end portions of said arms include openings for receiving said legs of said hooks respectively with said extensible apparatus axially extended laterally between said arms rearwardly extended, said openings situated for causing the received legs to prevent forward displacement of the yokes with said plate substantially covering the instrument panel.

4. The security apparatus according to claim 1, wherein:

said plate includes a bottom edge and two inverted generally U-shaped slots laterally spaced apart and open along said bottom edge for receiving the control columns when said plate substantially covers the instrument panel; and said arms are hingedly secured to said plate immediately inwardly of said slots respectively.

5. The security apparatus according to claim 1, wherein:

said plate includes a top edge and a bottom edge, a rearwardly extending top lip along said top edge and a rearwardly extending bottom lip along said bottom edge, said lips adapted for engaging the instrument panel when said plate substantially covers the instrument panel.

6. The security apparatus according to claim 1, in combination with the aircraft including a glare shield along the top of the instrument panel, wherein:

said plate includes a top edge contoured to engage the glare shield when said plate substantially covers the instrument panel.

7. The security apparatus according to claim 6, wherein:

said plate includes a bottom edge and a rearwardly extending lip therealong for engaging the instrument panel when said plate substantially covers the instrument panel.

8. The security apparatus according to claim 1, the aircraft including at least one engine control in the vicinity of the instrument panel, further including:

a stop rearwardly extending from said plate for preventing operational movement of the at least one engine control when said plate substantially covers the instrument panel.

9. The security apparatus according to claim 1, the aircraft including a throttle lever in the vicinity of the instrument panel, further including:

a tab rearwardly extending from said plate for preventing operational movement of the throttle control lever when said plate substantially covers the instrument panel.

10. The security device according to claim 9, the aircraft further including a fuel mixture control in the vicinity of the throttle control lever, wherein:

said tab extending from said plate further prevents operational movement of the fuel mixture control when said plate substantially covers the instrument panel.

11. In an aircraft, apparatus comprising:

a rearwardly facing instrument panel installed in the aircraft;

two flight control columns fully rearwardly extended from said instrument panel and terminating with respective flight control yokes fully rotated to one side;

a rigid plate substantially covering said instrument panel;

two rigid arms secured to said plate inwardly of said columns respectively, each of said arms extending rearwardly of said plate and including an end portion restrainably engaging said yokes respectively against rotation; and a locking device engageable with the end portions of said arms rearwardly extended for cooperating with said yokes for preventing forward displacement of said columns.

12. The apparatus according to claim 11, wherein:

said rigid arms are pivotally secured to said plate for being laterally pivoted forwardly toward said plate and rearwardly away from said plate, said end portions of said arms disengaging said yokes when said arms are forwardly pivoted; and said locking device is engageable with said end portions for locking said arms rearwardly extended and is disengageable from said end portions for unlocking said arms for permitting said arms to be forwardly pivoted.

13. In an aircraft including an instrument panel and two flight control yokes with respective flight control columns rearwardly extending from the instrument panel, a method for preventing unauthorized removal of instruments from the instrument panel and for preventing unauthorized use of the aircraft, comprising the steps of:

rotating the yokes fully to one side and pulling the columns fully rearwardly extended;

providing a rigid plate adapted for substantially covering the instrument panel, said plate having two rigid arms laterally pivotally secured thereto inwardly of the columns when said plate substantially covers the instrument panel;

placing said plate against the instrument panel for substantially covering the instrument panel;

laterally pivoting said arms such that said arms are rearwardly extended and engage the yokes for restraining rotational movement thereof;

providing means on said arms rearwardly extended for preventing forward displacement of the yokes; and locking said arms rearwardly extended.

* * * * *